US006640792B2

(12) United States Patent
Harvey et al.

(10) Patent No.: US 6,640,792 B2
(45) Date of Patent: Nov. 4, 2003

(54) AIR/OIL COALESCER WITH AN IMPROVED CENTRIFUGALLY ASSISTED DRAINAGE

(75) Inventors: William Bernard Harvey, Franklin, IN (US); Gregory W. Hoverson, Cookeville, TN (US)

(73) Assignees: Commins Engine Company, Inc., Columbus, IN (US); Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/207,579

(22) Filed: Jul. 29, 2002

(65) Prior Publication Data

US 2003/0034016 A1 Feb. 20, 2003

Related U.S. Application Data

(63) Continuation of application No. 09/931,127, filed on Aug. 16, 2001, now abandoned.

(51) Int. Cl.⁷ .............................................. F02M 25/06
(52) U.S. Cl. ....................................................... 123/572
(58) Field of Search ................................ 123/572, 573, 123/574, 41.86

(56) References Cited

U.S. PATENT DOCUMENTS

| | | | |
|---|---|---|---|
| 1,075,736 A | 10/1913 | Spiegel | |
| 2,795,291 A | 7/1957 | Pierce | |
| 3,018,896 A | 1/1962 | Gewiss | |
| 3,045,411 A | 7/1962 | Dalrymple | |
| 3,289,397 A | 12/1966 | Schonewald et al. | |
| 3,800,514 A | 4/1974 | Avondoglio et al. | |
| 3,993,564 A | 11/1976 | Novak | |
| 4,038,058 A | 7/1977 | Miskiewicz | |
| 4,049,401 A | 9/1977 | Smith | |
| 4,167,164 A | * 9/1979 | Bachmann | 123/572 |
| 4,189,310 A | 2/1980 | Hotta | |
| 4,411,675 A | 10/1983 | De Castella | |
| 4,547,208 A | 10/1985 | Oace | |

(List continued on next page.)

FOREIGN PATENT DOCUMENTS

| | | |
|---|---|---|
| DE | 620499 | 10/1935 |
| DE | 3702-765 A | 8/1988 |
| DE | 3938919 | 12/1990 |
| DE | 197 05 807 | 7/1998 |
| EP | 0073895 | 3/1983 |
| EP | 0649997 | 4/1995 |
| FR | 2700124 A1 | 7/1994 |

OTHER PUBLICATIONS

The Basics of Coalescing Filtration, *Finite Filter*, Bulletin No. 1300–700/NA, Parker Filtration.

Primary Examiner—Marguerite McMahon
(74) Attorney, Agent, or Firm—Woodard, Emhardt, Moriarty, McNett & Henry LLP

(57) ABSTRACT

A coalescing filter assembly and a corresponding cover are disclosed. The assembly is mounted to a rotating component substantially within an engine crankcase, and is synchronously rotated with the rotating component about an axis. Vent gas of the engine crankcase is in fluid communication with the coalescing filter assembly through one or more inlet ports. The coalescing filter assembly is preferably mounted to a gear and includes a filter located within a cavity formed between a first housing element and a second housing element. The coalescing filter assembly components are substantially concentric with the axis about which the gear rotates, and the assembly and gear synchronously rotate with one another. The cover preferably includes a diaphragm to control the rate of flow of vent gas from the engine crankcase through the coalescing filter assembly into the outlet conduit of the cover.

28 Claims, 2 Drawing Sheets

U.S. PATENT DOCUMENTS

| | | | |
|---|---|---|---|
| 4,714,139 A | | 12/1987 | Lorenz et al. |
| 4,901,703 A | * | 2/1990 | Humphries ................ 123/572 |
| 4,903,462 A | | 2/1990 | Nagashima et al. |
| 4,922,691 A | | 5/1990 | Shen |
| 4,981,502 A | | 1/1991 | Gottschalk |
| 5,113,836 A | | 5/1992 | Sweeten |
| 5,450,835 A | | 9/1995 | Wagner |
| 5,487,371 A | | 1/1996 | Beckman et al. |
| 5,507,268 A | | 4/1996 | Schlatti |
| 5,542,402 A | | 8/1996 | Lee et al. |
| 5,579,744 A | * | 12/1996 | Trefz ......................... 123/572 |
| 5,669,366 A | | 9/1997 | Beach et al. |
| 5,697,349 A | | 12/1997 | Blum |
| 5,716,423 A | | 2/1998 | Krul et al. |
| 5,954,035 A | | 9/1999 | Hofer et al. |
| 6,139,595 A | | 10/2000 | Herman et al. |
| 6,152,120 A | | 11/2000 | Julazadeh |
| 6,161,529 A | * | 12/2000 | Burgess ...................... 123/572 |
| 6,167,849 B1 | | 1/2001 | Wilson |
| 6,354,283 B1 | * | 3/2002 | Hawkins et al. ............ 123/572 |
| 6,422,224 B1 | * | 7/2002 | Walker, Jr. .................. 123/572 |

* cited by examiner

AIR/OIL COALESCER WITH AN IMPROVED CENTRIFUGALLY ASSISTED DRAINAGE

The present application is a continuation of, and claims priority to, U.S. patent application Ser. No. 09/931,127, filed on Aug. 16, 2001, now abandoned. Application Ser. No. 09/931,127 is incorporated herein by reference.

BACKGROUND

The present invention generally relates to the field of internal combustion engines, and more specifically to a coalescing filter assembly to remove oil aerosol from vent gas within the crankcase of the internal combustion engine.

Modern internal combustion engines including both diesel and gasoline engines are frequently provided with a ventilation system for venting air circulating within the crankcase of the engine. After an air-fuel mixture is drawn into the combustion chamber of the internal combustion engine, the mixture is ignited and burned until it is discharged into the atmosphere. However, not all of the air-fuel mixture is completely burned and discharged. During the operation of the engine, small amounts of hot combustion gases leak past the piston rings and through the oil circulating within the crankcase to create a pressurized mixture of air, exhaust gases and atomized oil. The leaked gas is commonly referred to as blow-by gas. If left unvented, the blow-by gas may cause a number of problems. First, the blow-by gas may deteriorate the quality of the lubricating oil present in the crankcase. Additionally the blow-by gas tends to increase the pressure in the crankcase and cause leaking of the lubricating oil. Therefore, a mechanism is required for removing blow-by gas from the crankcase.

In an effort to minimize environmental harm, it is preferable not to discharge air from within the crankcase directly to the atmosphere. Instead some means of removing oil entrained by the blow-by gas is utilized prior to venting to the atmosphere. Prior art air-oil coalescers include features such as elaborate labyrinth like designs and/or various filtration media. The filter media is often subject to clogging. Concerns for such systems include the possibility of over pressurization that may occur if the venting and/or filtering path becomes clogged or otherwise has an insufficient rate of removal of the gas from the crankcase interior.

Thus, a need remains for further contributions in this area of technology. The present invention satisfies this need in a novel and non-obvious fashion.

SUMMARY

One form of the present invention contemplates an air-oil coalescer for a gas in a crankcase of an engine, comprising: a first housing element having a substantially radial surface and a substantially axial surface, the radial surface coupled to a member within the crankcase that rotates about an axis; a second housing element having an outlet port, the second housing element adjoining the first housing element; a filter positioned within a cavity defined between the first housing element and the second housing element; and, wherein at least one of the first housing element and the second housing element includes a plurality of inlet ports, said filter positioned within the cavity such that the gas entering the inlet ports passes through at least a portion of the filter before exiting the outlet port.

Another form of the present invention contemplates: an air-oil coalescer for a vent gas in a crankcase of an engine, comprising: a filter; a housing having an at least partially hollow interior in fluid communication with the crankcase through at least one inlet opening, the housing also including an outlet opening; a rotating component within the crankcase; and, wherein the housing is concentrically mounted to the rotating component to synchronously rotate therewith about an axis, the at least one inlet port of the housing facing substantially radially from the axis, the filter being positioned within the housing so that the vent gas entering the interior of the housing through the at least one inlet opening must pass through the filter to reach the outlet opening.

Yet another form of the present invention contemplates an apparatus, comprising: a housing including a plurality of inlet ports and at least one outlet port; a filter positioned within the housing so that a fluid entering the inlet ports must pass through the filter to reach the outlet port; a cover including an outlet conduit having an intake opening and an exhaust opening, the intake opening being in fluid communication with the outlet port of the housing, the outlet conduit also being in fluid communication with an aperture, the aperture being in fluid communication with a fluid at atmospheric pressure; a diaphragm positioned within the outlet conduit; a spring positioned within the cover to bias the diaphragm toward the aperture; and, the diaphragm being movable within the cover from a first position wherein the outlet port of the housing is in fluid communication with the exhaust opening of the outlet conduit to a second position wherein the outlet port of the housing is not in fluid communication with the exhaust opening of the outlet conduit, and wherein the diaphragm is configured such that the fluid from the aperture exerts a force to move the diaphragm toward the second position and the fluid from the outlet port of the housing and the spring exert forces to move the diaphragm toward the first position.

One object of the present invention is to provide a unique air-oil coalescer.

Related objects and advantages of the present invention will be apparent from the following description.

DETAILED DESCRIPTION OF SELECTED EMBODIMENTS

Figure 1:
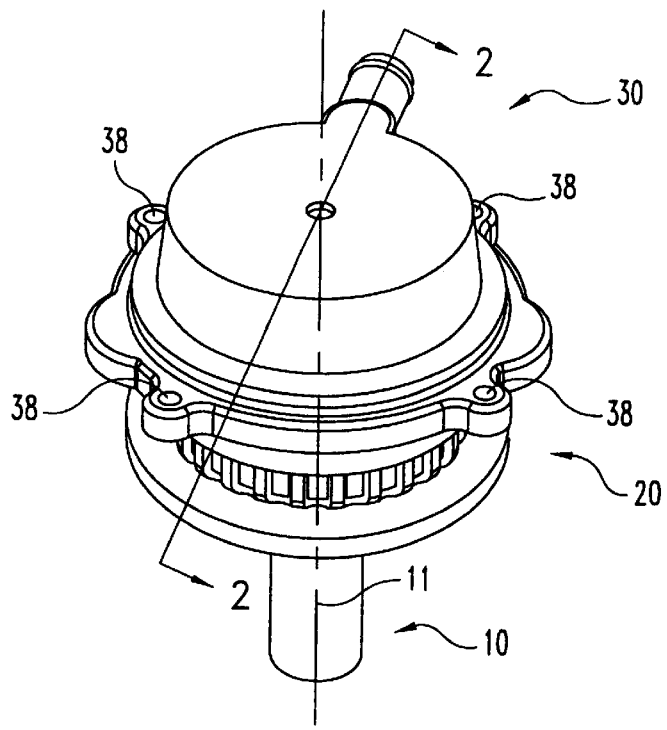
FIG. 1 is a perspective view of a coalescing filter assembly in accordance with the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. For purposes of the present invention, the term adjoined is broadly defined as a unitary fabrication, a permanent affixation, a detachable coupling, an engagement, an abutment, or a contiguous disposal by a method as would occur to one skilled in the art.

Figure 2:
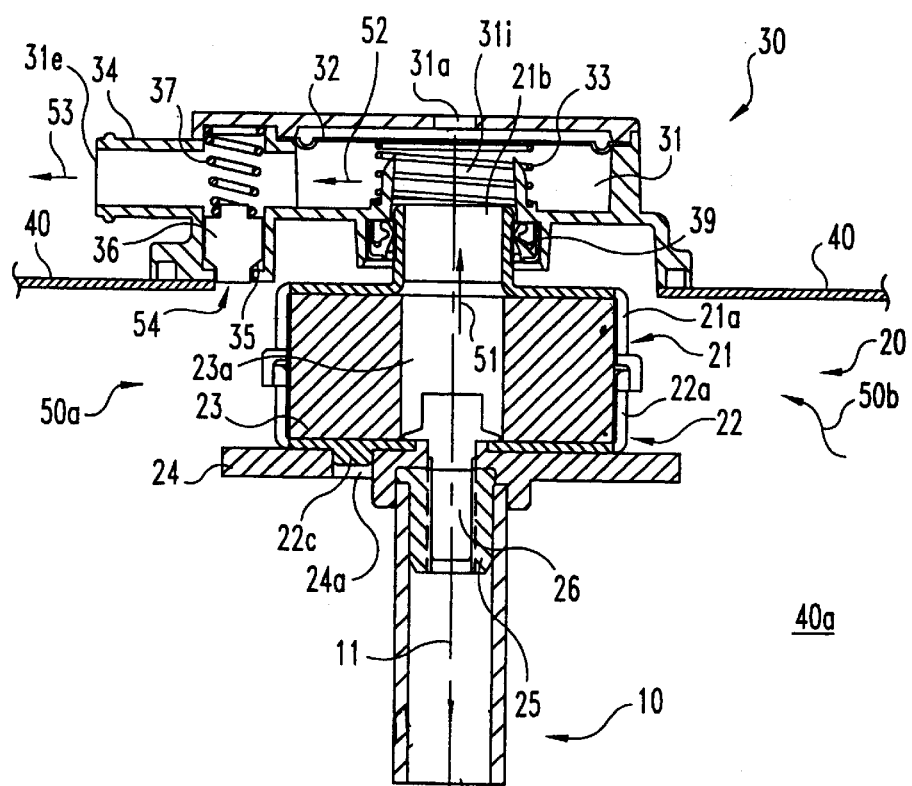
FIG. 2 is cross-sectional view of the coalescing filer assembly taken along line 2—2 of FIG. 1.

Referring to FIGS. 1 and 2, a rotating component in the form of a coalescing filter assembly 20 in accordance with one form of the present invention is illustrated. The coalescing filter assembly 20 is preferably positioned within an engine crankcase 40 with a cover 30 concealing the coalescing filter assembly 20 therein. The coalescing filter assembly 20 is operable to be rotated about a longitudinal axis 11. The coalescing filter assembly 20 is coupled to a rotatable member 24. In one form of the present invention the rotatable member 24 forms a portion of a gear 10 that is driven by the engine camshaft (not illustrated). However, it should be understood herein that the rotatable member 24 can be driven in a multitude of ways as believed known to one of ordinary skill in the art. The rotatable member 24 can be directly connected to the camshaft, mechanically coupled to the crankshaft or driven by a flexible intermediate member such as chains or belts. While the present invention will be described as being gear driven no intention to limit the present disclosure unless being specifically stated to the contrary is intended.

In one form of the present invention the coalescing filter assembly 20 includes an upper housing element 21, a lower housing element 22, and a filter 23. Upper housing element 21 and lower housing element 22 are adjoined to form a cavity therebetween. Filter 23 is positioned within at least a portion of the cavity. In the illustrated embodiment of the coalescing filter assembly 20, the upper housing element 21 and the lower housing element 22 may be welded together around filter 23. As such, coalescing filter assembly 20 is replaceable as an integral single unit. The integral single unit preferably including an upper housing element 21, a lower housing element 22 and a filter 23 that are coaxial and concentric with one another about the longitudinal axis 11. Thus, a worn out or defective integral single unit may be lifted out and easily replaced by a new unit.

It should be understood that alternative forms of coalescing filter assembly 20 are contemplated as within the scope of the invention wherein upper housing element 21 and lower housing element 22 may be manually separable, and thus each component of coalescing filter assembly 20 is individually replaceable. For example, the acts for installing one form of the coalescing filter assembly of the present invention will now be described. First the lower housing element 22 is concentrically aligned with and mounted to the rotatable member 24 comprising a portion of gear 10. Next the filter 23 is concentrically aligned with and set onto the lower housing element 22. Then the upper housing element 21 is concentrically aligned with and coupled to the lower housing element 22 with the filter 23 located between the housing elements 21, 22. Thus the coalescing filter assembly 20 is concentrically aligned with the corresponding gear 10 and the coalescing filter assembly 20 synchronously rotates with the gear 10. Filter 23 preferably has a hollow configuration including a fluid passage 23a.

Figure 3:
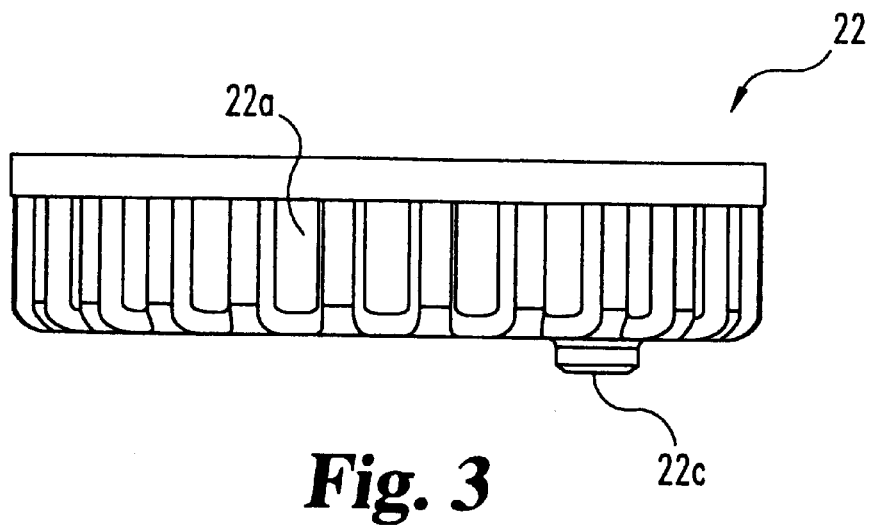
FIG. 3 is side view of a lower housing element of the coalescing filter assembly of FIG. 1
Figure 4:
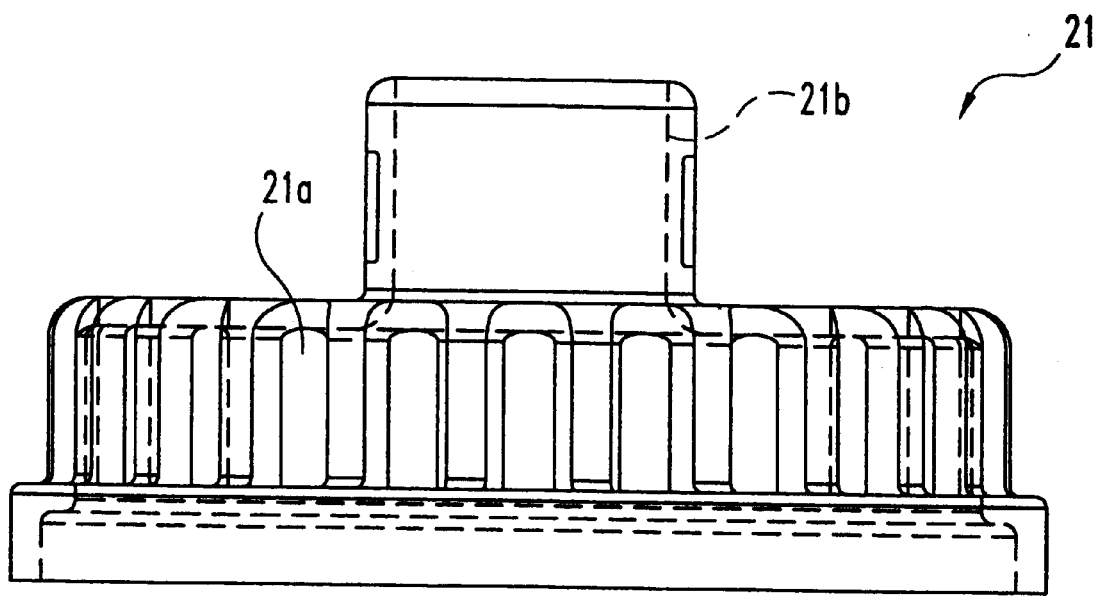
FIG. 4 is a side view of an upper housing element of the coalescing filter assembly of FIG. 1.

With reference to FIG. 3, lower housing element 22 preferably includes a plurality of inlet ports or windows 22a for providing fluid communication between the contents of the interior 40a of the engine crankcase 40 and fluid passage 23a. With reference to FIG. 4, upper housing element 21 preferably includes a plurality of inlet ports or windows 21a for providing fluid communication between the interior 40a of the engine crankcase 40 and fluid passage 23a. It should be understood that the number and dimensions of windows 22a in lower housing element 22 may be varied as would occur to one skilled in the art. It should also be understood that the number and dimensions of windows 21a in upper housing element 21 may be varied as would occur to one skilled in the art. For example, housing elements 21, 22 may have only one inlet port extending around a portion of the perimeter of the housings or may have a plurality of inlet ports spaced around the perimeter of the housings. Additionally, it should be understood that the inlet port or ports may all be located on one of the housing elements 21, 22.

Upper housing element 21 preferably further includes a fluid passage 21b in fluid communication with fluid passage 23a. It should be understood that alternative forms of filter 23 are contemplated as within the scope of the invention wherein the configuration of filter 23 may not include a fluid passage and may instead fill the entirety of the cavity within adjoined upper housing element 21 and lower housing element 22. It should also be understood that alternative forms are contemplated as within the scope of the invention wherein the configuration of upper housing element 21 may or may not include fluid passage 21b. It should be further understood that combinations of the above described alternative forms are also contemplated as within the scope of the invention so that the exhaust gas may flow into the windows 21a, 22a of upper and lower housing elements 21, 22, then through filter 23 before passing directly into fluid passage or outlet conduit 31 of cover 30, without passing through any intervening fluid passages.

Coalescing filter assembly 20 is adjoined to gear 10 whereby coalescing filter assembly 20 synchronously rotates with gear 10 about the longitudinal axis 11. One method of adjoining the coalescing filter assembly 20 to gear 10 includes frictionally fitting a mechanical coupler 25 within a channel 10a of the gear 10. The mechanical coupler 25 includes a channel extending along the longitudinal axis 11. Lower housing element 22 is mounted upon member 24 and preferably engages the member 24 by an annular protrusion 22c of housing element 22 being friction fitted within an aperture 24a of member 24. The lower housing element 22 preferably includes a channel extending along the longitudinal axis 11. A shank of a bolt 26 is preferably positioned within fluid passage 23a. The bolt 26 is downwardly screwed therein until the shank of bolt 26 serially extends through the respective channels of lower housing element 22, member 24, and mechanical coupler 25, and a portion of the head of bolt 26 preferably abuts lower housing element 22. The shank of bolt 26 includes threads (not illustrated) for engaging the internally threaded portion of mechanical coupler 25. As would occur to one skilled in the art, alternative methods of adjoining coalescing filter assembly 20 to gear 10 may be utilized in conjunction with the present invention.

Cover 30 includes a fluid passage or outlet conduit 31 in fluid communication with fluid passage 21b of upper housing element 21. When upper housing element 21 omits fluid passage 21b, fluid passage 31 is in direct fluid communication with fluid passage 23a. The illustrated manner of connecting coalescing filter assembly 20 to engine crankcase 40 includes extending bolts (not illustrated) through bolt holes 38 of cover 30 and threading them into internally threaded openings formed in the engine. The portion of upper housing element 21 including fluid passage 21b is positioned within an intake opening 31i of fluid passage 31. A seal 39, preferably ring shaped, provides a fluid tight connection while permitting rotation of the structure defining fluid passage 21b about the longitudinal axis 11. The present invention contemplates alternative methods of connecting the coalescing filter assembly 20 to the engine 40 as would occur to one skilled in the art.

In addition to fluid passage 31, cover 30 includes a diaphragm 32, a first spring 33, a fluid outlet 34, a fluid passage 35, a plunger 36, and a second spring 37. Diaphragm 32 is positioned within fluid passage 31 and movable therein. Diaphragm 32 is positioned substantially adjacent an atmospheric aperture or opening 31a of fluid passage 31. First spring 33 is seated within fluid passage 31 and adapted to bias diaphragm 32 toward atmospheric aperture 31a. Fluid outlet 34 has fluid passage 31 extending therethrough to exhaust opening 31e and is operable to be adjoined to a component of an internal combustion engine or vented to the atmosphere. In a preferred form of the present invention the component is defined by a turbocharger. Fluid passage 35 provides direct fluid communication between fluid passage 31 and the engine 40 without passing through the coalescing filter assembly 20. Plunger 36 is positioned within fluid passage 35, and movable therein. Second spring 37 is seated within fluid passage 31 to bias plunger 36 toward engine 40 and thus close fluid passage 35.

The normal operating condition of rotating component 10, coalescing filter assembly 20, and cover 30 will now be generally described herein. Vent gas from within the interior 40a of engine crankcase 40 will flow in the directions generally indicated by arrows 50a, 50b. The vent gas next flows through windows 21a, 22a of upper and lower housing elements 21, 22 respectively. The vent gas then flows into filter 23 whereby filter 23 extracts oil droplets and/or other contaminants from the exhaust gas. A centrifugal force is applied to the fluid within the filter assembly by the rotation of gear and coalescing filter assembly 20 about the longitudinal axis 11. The rotation thereby expels the extracted oil and/or other contaminants radially outward. In one form the extracted oil is passed radially outward and flows through windows 21a, 22a of housing elements 21, 22 respectively, and back into the interior 40a of the engine crankcase 40. The exhaust gas flows through fluid passage 23a and fluid passage 21b in the direction of arrow 51. It should be understood that the coalescing filter assembly 20 is operable to separate the vent gas into exhaust gas and oil material. When the diaphragm 32 is in a first position spaced from the inlet opening of fluid passage 31 as illustrated in FIG. 2, the exhaust gas flows into intake opening 31i and through fluid passage 31 in the direction of the arrow 52 and out the exhaust opening 31e as indicated by the arrow 53.

The spacing of diaphragm 32 relative to the intake opening 31i of the fluid passage 31 is a function of the pressure of the atmospheric air acting on the diaphragm 32 through the atmospheric aperture 31a and the pressure of the exhaust gas entering fluid passage 31 through intake opening 31i. In the normal operating condition, the pressure of the atmospheric air is equal to or less than the pressure of the exhaust gas. Thus, first spring 33 biases diaphragm 32 to the first position illustrated in FIG. 2 and permits a predetermined flow of the exhaust gas from fluid passage 21b into fluid passage 31.

In the normal operating condition the pressure of the exhaust gas within the interior 40a of engine crankcase 40 will be equal to or less than the pressure of the exhaust gas within fluid passage 31. Therefore, plunger 36 is normally biased by second spring 37 to a position within fluid passage 35 that minimizes or prevents exhaust gas from escaping the interior 40a of engine crankcase 40 through fluid passage 35 into fluid passage 31. Since any vent gas flowing from the interior 40a of engine crankcase 40 through the fluid passage 35 into fluid passage 31 would normally contain more oil droplets and/or other contaminants than the exhaust gas that passes through coalescing filter assembly 20, the second spring 37 is selected to position plunger 36 within fluid passage 35 and normally prevent the flow of the vent gas from engine crankcase 40 through fluid passage 35 into fluid passage 31.

If an under pressurization operating condition exists, then the pressure of the atmospheric air acting on diaphragm 32 is greater than the pressure of the exhaust gas acting on the diaphragm 32. When this condition occurs, the force of the atmospheric air against diaphragm 32 may overcome that of first spring 33 and displace diaphragm 32 toward the intake opening 31i of passage 31, thus reducing the flow rate of the exhaust gas from fluid passage 21b into fluid passage 31. The degree of any displacement of diaphragm 32 is a function of the downward force being applied to diaphragm 32 by the atmospheric air and the upward force being applied to diaphragm 32 by first spring 33 and the exhaust gas. As such, the downward force being applied to diaphragm 32 by the atmospheric air can exceed the upward force being applied to diaphragm 32 to a degree that displaces diaphragm 32 to a second position adjacent the intake opening 31i of fluid passage 31, thus preventing any flow of the exhaust gas out of the coalescing filter assembly 20.

If an over pressurization operating condition exists, then the pressure of the vent gas within interior 40a of engine crankcase 40 is greater than the pressure of the exhaust gas within fluid passage 31. When this occurs the force of the vent gas in interior 40a against plunger 36 may overcome the resistance of the second spring 37 and displace plunger 36 toward fluid passage 31. The degree of any displacement of plunger 36 is a function of the downward force being applied to plunger 36 by the exhaust gas within outlet conduit 31 and second spring 37 and the upward force being applied to plunger 36 by the vent gas within interior 40a of engine 40. As such, the upward force being applied to plunger 36 by the vent gas within interior 40a of engine 40 may exceed the downward force being applied to plunger 36 to a degree that positions plunger 36 within fluid passage 31, thus permitting exhaust gas to flow in the direction of arrow 54 directly from the interior 40a of engine crankcase 40 into fluid passage 31. This opening of plunger 36 will provide for the by-passing of the coalescing filter assembly 20 and the direct venting of the interior 40a of engine crankcase 40.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a," "an," "at least one," are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An air-oil coalescer for a gas in a crankcase of an engine, comprising:
   a first housing element having a substantially radial surface and a substantially axial surface, the radial surface coupled to a member within the crankcase that rotates about an axis;
   a second housing element having an outlet port, said second housing element adjoining said first housing element;

a filter positioned within a cavity defined between said first housing element and said second housing element; and, wherein at least one of said first housing element and said second housing element includes a plurality of inlet ports, said filter positioned within the cavity such that the gas entering said inlet ports passes through at least a portion of the filter before exiting said outlet port.

2. The coalescer of claim 1, wherein said first housing element and said second housing element and said member are substantially concentric about the axis.

3. The coalescer of claim 1,
wherein said filter includes a first fluid passage; and
whereby a first portion of the gas is capable of flowing from the engine crankcase through said filter to said first fluid passage.

4. The coalescer of claim 3, further comprising:
a cover coupled with the engine crankcase, said cover including a second fluid passage disposed in fluid communication with said first fluid passage; and
a diaphragm positioned within said second fluid passage and defining a cavity separate from said second fluid passage and having an atmospheric opening, said diaphragm operable to control the flow of the first portion of gas from said first fluid passage into said second fluid passage.

5. The coalescer of claim 4, wherein said diaphragm is normally biased into a first position to allow a predetermined flow rate of the first portion of gas from said first fluid passage into said second fluid passage.

6. The coalescer of claim 5, wherein the movement of the diaphragm is a function of the force asserted by the pressure of the atmospheric air in said cavity acting on said diaphragm and the combined force of a spring biasing said diaphragm into said first position and the pressure of the first portion of gas acting on said diaphragm.

7. The coalescer of claim 4, wherein said cover further includes a third fluid passage in fluid communication with the engine crankcase and in fluid communication with said second fluid passage, whereby a second portion of the gas is capable of flowing from the engine crankcase through said third fluid passage to said second fluid passage; and
a plunger disposed within said third fluid passage, said plunger operable to control the flow of the second portion of gas from the engine crankcase through said third fluid passage into said second fluid passage.

8. The coalescer of claim 3, further comprising:
a cover coupled with the engine crankcase, said cover including a second fluid passage in fluid communication with said first fluid passage, whereby the first portion of gas is capable of flowing from said first fluid passage into said second fluid passage; and
means for controlling the flow of the first portion of gas from said first fluid passage into said second fluid passage.

9. The coalescer of claim 8, wherein said cover further includes:
a third fluid passage disposed in fluid communication with the engine crankcase and in fluid communication with said second fluid passage, whereby a second portion of gas is capable of flowing from the engine crankcase through said third fluid passage to said second fluid passage; and
means for controlling the flow rate of the second portion of gas from the engine crankcase through said third fluid passage into said second fluid passage.

10. The coalescer of claim 1,
wherein said filter includes a first fluid passage, and
wherein said first and second housing elements include a plurality of inlet ports adapted to provide fluid communication between the engine crankcase and said filter.

11. The coalescer of claim 9, which further comprises:
a cover coupled with the engine crankcase, said cover including a second fluid passage disposed in fluid communication with said first fluid passage; and
a diaphragm positioned within said second fluid passage and defining a fluid cavity within said cover and adjacent said second fluid passage and having an atmospheric opening adapted to allow atmospheric air to act on said diaphragm, said diaphragm operable to control the flow of the first portion of gas from said first fluid passage into said second fluid passage.

12. The coalescer of claim 11, wherein said diaphragm is normally spring biased into a first position to allow a predetermined flow rate of the first portion of gas from said first fluid passage into said second fluid passage, and wherein the movement of said diaphragm is controlled by the difference between the force applied by the pressure of the atmospheric air acting on said diaphragm and the combined force of said spring and the first portion of gas acting on said diaphragm.

13. The coalescer of claim 11, wherein said cover further includes a third fluid passage in fluid communication with the engine crankcase and in fluid communication with said second fluid passage, whereby a second portion of the gas is capable of flowing from the engine crankcase through said third fluid passage to said second fluid passage; and
a sealing member disposed within said third fluid passage, said sealing member operable to control the flow of the second portion of gas from the engine crankcase through said third fluid passage into said second fluid passage.

14. The coalescer of claim 1,
wherein said filter includes a first fluid passage;
wherein said first and second housing elements each include a plurality of inlet ports, whereby a first portion of the gas is capable of flowing from the engine crankcase through said filter to said first fluid passage, and
a second fluid passage in fluid communication with said first fluid passage whereby the first portion of gas is capable of flowing from said first fluid passage into said second fluid passage.

15. The coalescer of claim 14, further comprising:
a cover coupled with the engine crankcase and concealing said housings within the engine crankcase, said cover including:
a third fluid passage in fluid communication with the engine crankcase and in fluid communication with said second fluid passage, whereby a second portion of the gas is capable of flowing from the engine crankcase through said third fluid passage to said second fluid passage; and
a sealing member disposed within said third fluid passage, said sealing member operable to control the flow of the second portion of gas from the engine crankcase through said third fluid passage into said second fluid passage.

16. An air-oil coalescer for a vent gas in a crankcase of an engine, comprising:
   a filter;
   a housing having an at least partially hollow interior in fluid communication with the crankcase through at least one inlet opening, said housing also including an outlet opening;
   a rotating component within the crankcase; and,
   wherein the housing is concentrically mounted to the rotating component to synchronously rotate therewith about an axis, the at least one inlet port of the housing facing substantially radially from the axis, the filter being positioned within the housing so that the vent gas entering the interior of the housing through the at least one inlet opening must pass through the filter to reach the outlet opening.

17. The coalescer of claim 16, which further includes a cover coupled with the engine crankcase, said cover including a first fluid passage disposed in fluid communication with said outlet opening; and
   a diaphragm positioned within said first fluid passage and defining a fluid chamber separate from said first fluid passage, said fluid chamber having at least one opening to atmosphere, and said diaphragm operable to control the flow of vent gas from said outlet opening into said first fluid passage.

18. The coalescer of claim 17, which further includes a spring positioned within said cover to bias said diaphragm to a first position, and wherein the movement of said diaphragm from said first position is a function of the force asserted by the atmospheric air on said diaphragm and the combination of the force asserted by the vent gas and said spring acting on said diaphragm.

19. The coalescer of claim 17, wherein said cover further includes:
   a second fluid passage in fluid communication with the engine crankcase and in fluid communication with said first fluid passage, whereby a portion of the vent gas is capable of flowing from the engine crankcase through said second fluid passage to said first fluid passage without passing through said outlet opening; and
   a plunger disposed within said second fluid passage, said plunger operable to control the flow of the portion of vent gas from the engine crankcase through said second fluid passage into said first fluid passage.

20. The coalescer of claim 16, wherein said at least one inlet opening defines a plurality of inlet openings.

21. An apparatus for handling an engine vent fluid including oil droplets, comprising:
   a rotatable housing including a plurality of inlet ports and at least one outlet port;
   a filter positioned within the rotatable housing so that the vent fluid entering the inlet ports must pass through the filter to reach the outlet port, wherein during rotation of said housing a centrifugal force is applied to the vent fluid to expel a substantial portion of the oil droplets from the vent fluid;
   a cover including an outlet conduit having an intake opening and an exhaust opening, the intake opening being in fluid communication with the outlet port of the housing, the outlet conduit also being in fluid communication with an aperture, the aperture being in fluid communication with a fluid at atmospheric pressure;
   a diaphragm positioned within the outlet conduit;
   a spring positioned within the cover to bias the diaphragm toward the aperture; and,
   the diaphragm being movable within the cover from a first position wherein the outlet port of the housing is in fluid communication with the exhaust opening of the outlet conduit to a second position wherein the outlet port of the housing is not in fluid communication with the exhaust opening of the outlet conduit, and wherein the diaphragm is configured such that the fluid from the aperture exerts a force to move the diaphragm toward the second position and the fluid from the outlet port of the housing and the spring exert forces to move the diaphragm toward the first position.

22. The apparatus of claim 21, wherein said cover further includes:
   a fluid passage in fluid communication with the engine crankcase and in fluid communication with said outlet conduit, whereby a portion of the vent fluid within the crankcase is capable of flowing from the crankcase through said fluid passage to said outlet conduit; and
   a plunger disposed within said fluid passage, said plunger operable to control the flow of the portion of vent fluid from the crankcase through said fluid passage into said outlet conduit.

23. An air-oil coalescer assembly, comprising:
   a rotatable body having a longitudinal axis, said rotatable body including a plurality of radial in-flow inlets adapted to receive engine crankcase gas from an internal combustion engine, and an outlet;
   a filter positioned within said body and disposal such that engine crankcase gas flows through the inlet and through at least a portion of said filter before exiting the outlet; and
   a pressure activated valve adjacent said outlet, said valve controlling the flow of crankcase gas from said outlet.

24. The air-oil coalescer assembly of claim 23, wherein said valve allows fluid flow from said outlet when the pressure of the engine crankcase gas differs from atmospheric pressure by a first predetermined amount.

25. The air-oil coalescer assembly of claim 24, wherein said valve prevents fluid flow from said outlet when the pressure of the engine crankcase gas is less than atmospheric pressure by a second predetermined amount.

26. The air-oil coalescer assembly of claim 23, wherein said valve is connected directly with said outlet.

27. The air-oil coalescer assembly of claim 23, further comprising a spring biasing said valve in an initial open state.

28. The air-oil coalescer assembly of claim 23, which further includes bypass means for venting engine crankcase gas directly from the internal combustion engine.

* * * * *

UNITED STATES PATENT AND TRADEMARK OFFICE
CERTIFICATE OF CORRECTION

PATENT NO.    : 6,640,792 B2                                                    Page 1 of 1
DATED         : November 4, 2003
INVENTOR(S)   : William Bernard Harvey et al.

It is certified that error appears in the above-identified patent and that said Letters Patent is hereby corrected as shown below:

Column 1,
Line 3, please insert the following paragraph:
-- This invention was made with Government support under Contract No. DEFC05970R22533 awarded by the United States Department of Energy. The Department of Energy has certain rights in this invention. --

Signed and Sealed this

Twenty-fourth Day of February, 2004

JON W. DUDAS
*Acting Director of the United States Patent and Trademark Office*